(12) United States Patent
Hahn et al.

(10) Patent No.: US 11,139,920 B2
(45) Date of Patent: Oct. 5, 2021

(54) METHOD AND APPARATUS FOR HYBRID AUTOMATIC REPEAT REQUEST IN SIDELINK COMMUNICATIONS

(71) Applicants: Hyundai Motor Company, Seoul (KR); Kia Motors Corporation, Seoul (KR); Industry-Academic Cooperation Foundation, Dankook University, Gyeonggi-do (KR)

(72) Inventors: Gene Beck Hahn, Gyeonggi-do (KR); Su Han Choi, Gyeonggi-do (KR)

(73) Assignees: Hyundai Motor Company, Seoul (KR); Kia Motors Corporation, Seoul (KR); Industry-Academic Cooperation Foundation, Dankook University, Yongin (KR)

( * ) Notice: Subject to any disclaimer, the term of this patent is extended or adjusted under 35 U.S.C. 154(b) by 9 days.

(21) Appl. No.: 16/668,626

(22) Filed: Oct. 30, 2019

(65) Prior Publication Data
US 2020/0136760 A1 Apr. 30, 2020

Related U.S. Application Data

(60) Provisional application No. 62/753,273, filed on Oct. 31, 2018.

(30) Foreign Application Priority Data

Oct. 15, 2019 (KR) .......................... 10-2019-0128048

(51) Int. Cl.
*H04L 1/16* (2006.01)
*H04L 1/18* (2006.01)
(Continued)

(52) U.S. Cl.
CPC .......... *H04L 1/1621* (2013.01); *H04L 1/1812* (2013.01); *H04L 5/0007* (2013.01); *H04L 12/18* (2013.01); *H04W 72/04* (2013.01)

(58) Field of Classification Search
CPC ... H04L 1/1621; H04L 1/1812; H04L 5/0007; H04L 12/18; H04L 1/1896; H04L 1/1861;
(Continued)

(56) References Cited

U.S. PATENT DOCUMENTS

2019/0052436 A1* 2/2019 Desai ........................ H04L 1/18
2020/0022089 A1* 1/2020 Guo ..................... H04W 52/146
(Continued)

OTHER PUBLICATIONS

3GPP TSG-RAN WG1 Meeting #94bis; R1-1811615 Chengdu, China, Oct. 8-12, 2018 (Year: 2018).*
(Continued)

*Primary Examiner* — Hassan A Phillips
*Assistant Examiner* — Mohammed S Chowdhury
(74) *Attorney, Agent, or Firm* — Mintz Levin Cohn Ferris Glovsky and Popeo, P.C.; Peter F. Corless

(57) ABSTRACT

A sidelink communication method performed by a first user equipment (UE) in a communication system includes steps of: generating sidelink control information (SCI) including first resource allocation information for sidelink groupcast data and second resource allocation information for a hybrid automatic repeat request (HARQ) response for the sidelink groupcast data; transmitting the SCI to a plurality of UEs participating in sidelink communication; transmitting the sidelink groupcast data to the plurality of UEs using resources indicated by the first resource allocation information; and receiving the HARQ response for the sidelink group data from one or more UEs among the plurality of UEs using resources indicated by the second resource allocation information.

16 Claims, 8 Drawing Sheets

(51) Int. Cl.
*H04L 5/00* (2006.01)
*H04L 12/18* (2006.01)
*H04W 72/04* (2009.01)

(58) Field of Classification Search
CPC .......... H04L 2001/0093; H04W 72/04; H04W 72/005; H04W 4/08; H04W 28/04; H04W 72/0406; H04W 4/40
See application file for complete search history.

(56) References Cited

U.S. PATENT DOCUMENTS

| | | | |
|---|---|---|---|
| 2020/0029318 A1* | 1/2020 | Guo | H04W 4/40 |
| 2020/0099476 A1* | 3/2020 | Park | H04W 4/70 |
| 2020/0106566 A1* | 4/2020 | Yeo | H04W 28/04 |
| 2020/0112400 A1* | 4/2020 | Lee | H04W 76/11 |
| 2020/0154404 A1* | 5/2020 | Goktepe | H04L 1/0061 |

OTHER PUBLICATIONS

3GPP TSG RAN WG1 Meeting #94bis; R1-1811426; Chengdu, China, Oct. 8-12, 2018 (Year: 2018).*
3GPP TSG RAN WG1 Meeting #94bis;R1-1811036; Chengdu, China, Oct. 8-12, 2018 (Year: 2018).*
3GPP TSG RAN WG1 Meeting #94bis;R1-1810453; Chengdu, China, Oct. 8-12, 2018 (Year: 2018).*
3GPP TSG RAN WG1 Meeting #94bis; R1-1810137; Chengdu, China, Oct. 8-12, 2018 (Year: 2018).*
3GPP TSG-RAN WG1 Meeting #94bis; R1-1811615 Chengdu, China, Oct. 8-12, 2018 (Year: 2018) (Year: 2018).*
3GPP TSG RAN WG1 Meeting #94bis; R1-1811426; Chengdu, China, Oct. 8-12, 2018 (Year: 2018) (Year: 2018).*
3GPP TSG RAN WG1 Meeting #94bis ; R1-1811420 ;Chengdu, China, Oct. 8-12, 2018 (Year: 2018).*
3GPP TSG RAN WG1 Meeting #94bis;R1-1811036; Chengdu, China, Oct. 8-12, 2018 (Year: 2018) (Year: 2018).*
3GPP TSG RAN WG1 Meeting #94bis;R1-1810453; Chengdu, China, Oct. 8-12, 2018 (Year: 2018) (Year: 2018).*
3GPP TSG RAN WG1 Meeting #94bis; R1-1810137; Chengdu, China, Oct. 8-12, 2018 (Year: 2018) (Year: 2018).*
"Discussion on NR V2X HARQ Mechanism", ITL, 3GPP TSG-RAN WG1 Meeting #94bis Chengdu, China, R1-1811615, Oct. 8-12, 2018, 4 pages.
"On Sidelink Unicast, Groupcast and Broadcast", Nokia, Nokia Shanghai Bell, 3GPP TSG RAN WG1 Meeting #94bis Chengdu, China, R1-1811426, Oct. 8-12, 2018, 5 pages.
"On Support of HARQ for V2x Communications", Xiaomi Communications, 3GPP TSG RAN WG1 Meeting #94bis Chengdu, China, R1-1811420, Oct. 8-12, 2018, 2 pages.
"Physical Layer Structure for NR Sidelink", MediaTek Inc., 3GPP TSG RAN WGI Meeting #94bis Chengdu, China, R1-1810453, Oct. 8-12, 2018, 9 pages.

* cited by examiner

METHOD AND APPARATUS FOR HYBRID AUTOMATIC REPEAT REQUEST IN SIDELINK COMMUNICATIONS

CROSS-REFERENCE TO RELATED APPLICATIONS

This application claims the benefit of priority to U.S. Provisional Patent Application No. 62/753,273, filed on Oct. 31, 2018 in the U.S. Patent and Trademark Office, and Korean Patent Application No. 10-2019-0128048, filed on Oct. 15, 2019 in the Korean Intellectual Property Office (KIPO), the entire contents of which are incorporated herein by reference.

BACKGROUND

1. Technical Field

The present disclosure relates generally to sidelink communication technologies, more particularly, to a technique for hybrid automatic repeat request (HARQ) feedback for sidelink groupcast communication.

2. Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

On the other hand, sidelink communication may be performed in a groupcast scheme. Since a hybrid automatic repeat request (HARQ) feedback procedure is not used in sidelink groupcast communications, bit error rate (BER) or block error rate (RLER) may increase in case of a poor channel state (e.g., a case having a large noise and/or a large interference). In this case, a retransmission procedure may be performed.

In the sidelink groupcast communication, the retransmission procedure may be performed in an automatic repeat request (ARQ) scheme by a radio link control (RLC) layer. The size of the packet retransmitted in the ARQ feedback procedure may be larger than the size of the packet retransmitted in the HARQ feedback procedure, and the retransmission delay in the ARQ feedback procedure may be larger than that in the HARQ feedback procedure. Therefore, transmission performance of the sidelink groupcast communication may be remarkably degraded.

SUMMARY

Accordingly, exemplary embodiments of the present disclosure provide an apparatus and a method for HARQ feedback in sidelink groupcast communication.

According to exemplary embodiments of the present disclosure, a sidelink communication method performed by a first user equipment (UE) in a communication system may comprise generating sidelink control information (SCI) including first resource allocation information for sidelink groupcast data and second resource allocation information for a hybrid automatic repeat request (HARQ) response for the sidelink groupcast data; transmitting the SCI to a plurality of UEs participating in sidelink communication; transmitting the sidelink groupcast data to the plurality of UEs using resources indicated by the first resource allocation information; and receiving the HARQ response for the sidelink group data from one or more UEs among the plurality of UEs using resources indicated by the second resource allocation information.

The SCI may further include an indicator indicating whether or not to perform an HARQ response procedure for the sidelink groupcast data.

The SCI may be generated using a sidelink groupcast-radio network temporary identifier (SG-RNTI) configured for sidelink groupcast communication.

A format of the SCI may be configured differently according to an allocation scheme or an indication scheme of time-frequency resources for the HARQ response.

The second resource allocation information may include information indicating time-frequency resources used for transmission of the HARQ response, and the time-frequency resources may be configured to be orthogonal for the plurality of UEs.

The information indicating the time-frequency resources may be a bitmap, and the bitmap may be composed of sidelink groupcast identifiers used to distinguish the plurality of UEs in the sidelink communication.

The second resource allocation information may include information indicating a reference point and an offset between the reference point and a starting point of each of the time-frequency resources for the plurality of UEs.

The second resource allocation information may include information on orthogonal cover codes (OCCs) applied to the HARQ response, and the OCCs may be configured to be orthogonal for the plurality of UEs.

The sidelink communication method may further comprise performing a retransmission procedure of the sidelink groupcast data when the HARQ response received from the one or more UEs is a negative acknowledgement (NACK), wherein the retransmission procedure is performed in a groupcast scheme with all UEs participating in the sidelink communication, a groupcast scheme with the one or more UEs, or a unicast scheme with each of the one or more UEs.

Furthermore, in accordance with exemplary embodiments of the present disclosure, a sidelink communication method performed by a first UE in a communication system may comprise receiving an SCI from a second UE, the SCI including first resource allocation information for sidelink groupcast data and second resource allocation information for a hybrid automatic repeat request (HARQ) response for the sidelink groupcast data; receiving the sidelink groupcast data from the second UE through resources indicated by the first resource allocation information; and transmitting the HARQ response for the sidelink groupcast data to the second UE through resources indicated by the second resource allocation information.

The SCI may further include an indicator indicating whether or not to perform an HARQ response procedure for the sidelink groupcast data, and the HARQ response may be transmitted when the indicator indicates that the HARQ response procedure is performed.

The SCI may be received using a sidelink groupcast-radio network temporary identifier (SG-RNTI) configured for sidelink groupcast communication.

A format of the SCI may be configured differently according to an allocation scheme or an indication scheme of time-frequency resources for the HARQ response.

The second resource allocation information may include information indicating time-frequency resources used for transmission of the HARQ response, and the time-frequency resources may be configured to be orthogonal for the plurality of UEs.

The second resource allocation information may include information on orthogonal cover codes (OCCs) applied to the HARQ response, and the OCCs may be configured to be orthogonal for the plurality of UEs.

Furthermore, in accordance with exemplary embodiments of the present disclosure, a first UE performing sidelink communication in a communication system may comprise a processor and a memory storing at least one instruction executable by the processor, wherein when executed by the processor. Also, the at least one instruction may be configured the processor to generate sidelink control information (SCI) including first resource allocation information for sidelink groupcast data and second resource allocation information for a hybrid automatic repeat request (HARQ) response for the sidelink groupcast data; transmit the SCI to a plurality of UEs participating in sidelink communication; transmit the sidelink groupcast data to the plurality of UEs using resources indicated by the first resource allocation information; and receive the HARQ response for the sidelink group data from one or more UEs among the plurality of UEs using resources indicated by the second resource allocation information.

The SCI may further include an indicator indicating whether or not to perform an HARQ response procedure for the sidelink groupcast data.

The second resource allocation information may include information indicating time-frequency resources used for transmission of the HARQ response, and the time-frequency resources may be configured to be orthogonal for the plurality of UEs.

The second resource allocation information may include information on orthogonal cover codes (OCCs) applied to the HARQ response, and the OCCs may be configured to be orthogonal for the plurality of UEs.

The at least one processor may be further configured the processor to perform a retransmission procedure of the sidelink groupcast data when the HARQ response received from the one or more UEs is a negative acknowledgement (NACK), wherein the retransmission procedure is performed in a groupcast scheme with all UEs participating in the sidelink communication, a groupcast scheme with the one or more UEs, or a unicast scheme with each of the one or more UEs.

According to the exemplary embodiments of the present disclosure, a hybrid automatic repeat request (HARQ) response resource (e.g., time-frequency resource for transmission of the HARQ response, orthogonal cover code applied to the HARQ response, etc.) for sidelink groupcast data in sidelink groupcast communication may be configured for each user equipment (UE). For example, HARQ response resources for UEs participating in sidelink groupcast communication may be orthogonal to each other. Accordingly, a transmitting UE can receive HARQ responses for the sidelink groupcast data from a plurality of receiving UEs using the orthogonal resources, and can perform a retransmission procedure of the sidelink groupcast data based on the HARQ responses. As a result, the performance of the communication system can be improved.

BRIEF DESCRIPTION OF DRAWINGS

Embodiments of the present disclosure will become more apparent by describing in detail embodiments of the present disclosure with reference to the accompanying drawings, in which.

Figure 1:
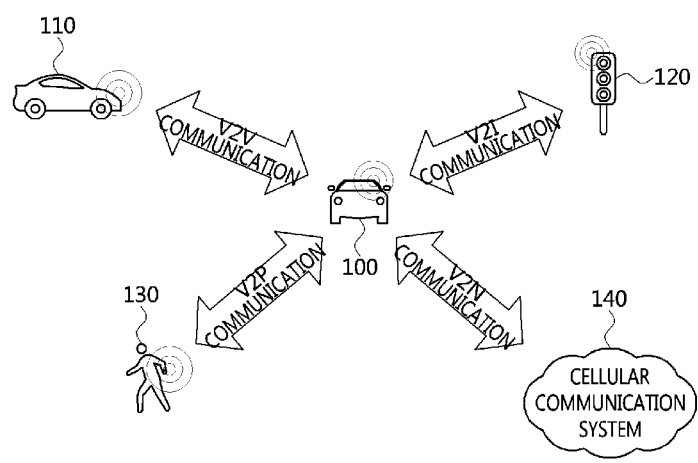
FIG. 1 is a conceptual diagram illustrating V2X communication scenarios.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
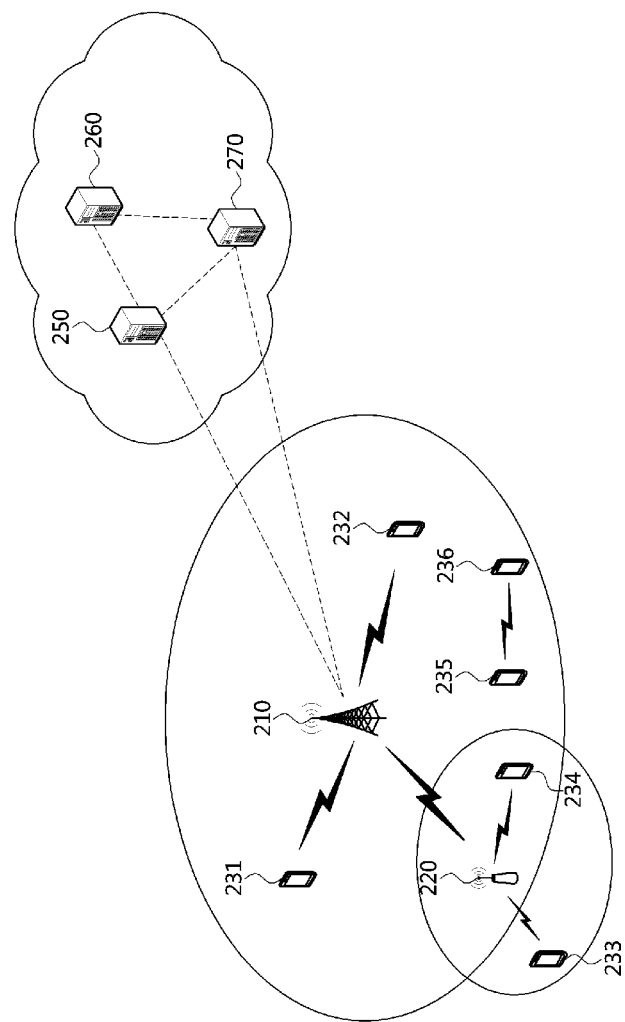
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
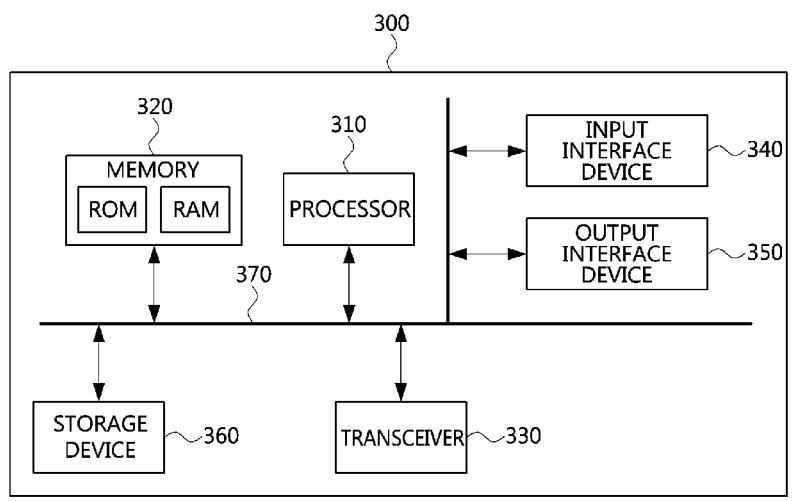
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
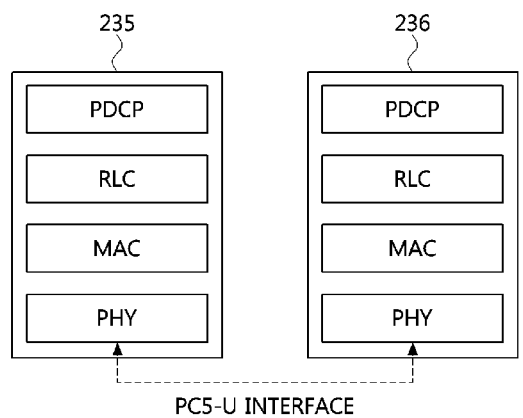
FIG. 4 is a block diagram illustrating an exemplary embodiment of a user plane protocol stack of an UE performing sidelink communication.

FIG. 4 is a block diagram illustrating an exemplary embodiment of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
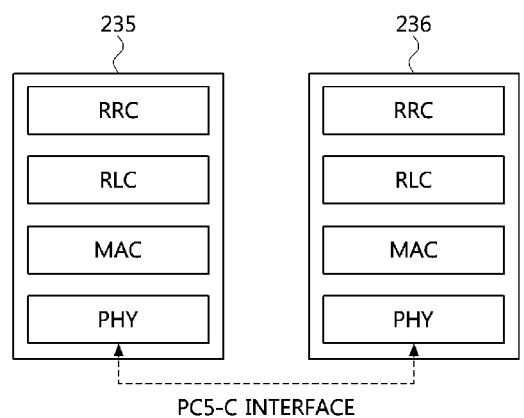
FIG. 5 is a block diagram illustrating a first exemplary embodiment of a control plane protocol stack of an UE performing sidelink communication.
Figure 6:
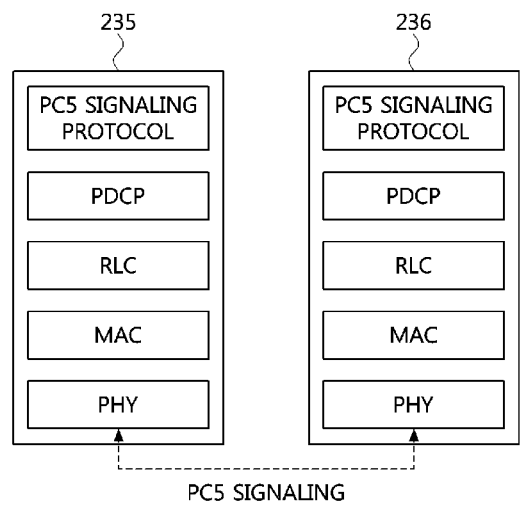
FIG. 6 is a block diagram illustrating a second exemplary embodiment of a control plane protocol stack of an UE performing sidelink communication.

FIG. 5 is a block diagram illustrating a first exemplary embodiment of a control plane protocol stack of an UE performing sidelink communication, and FIG. 6 is a block diagram illustrating a second exemplary embodiment of a control plane protocol stack of an UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for configuring sidelink resources will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of the vehicle 100 is described, the corresponding vehicle 110 may perform an operation corresponding to the operation of the vehicle 100. Conversely, when an operation of the vehicle 110 is described, the corresponding vehicle 100 may perform an operation corresponding to the operation of the vehicle 110. In the embodiments described below, the operation of the vehicle may be the operation of the communication node located in the vehicle.

Figure 7:
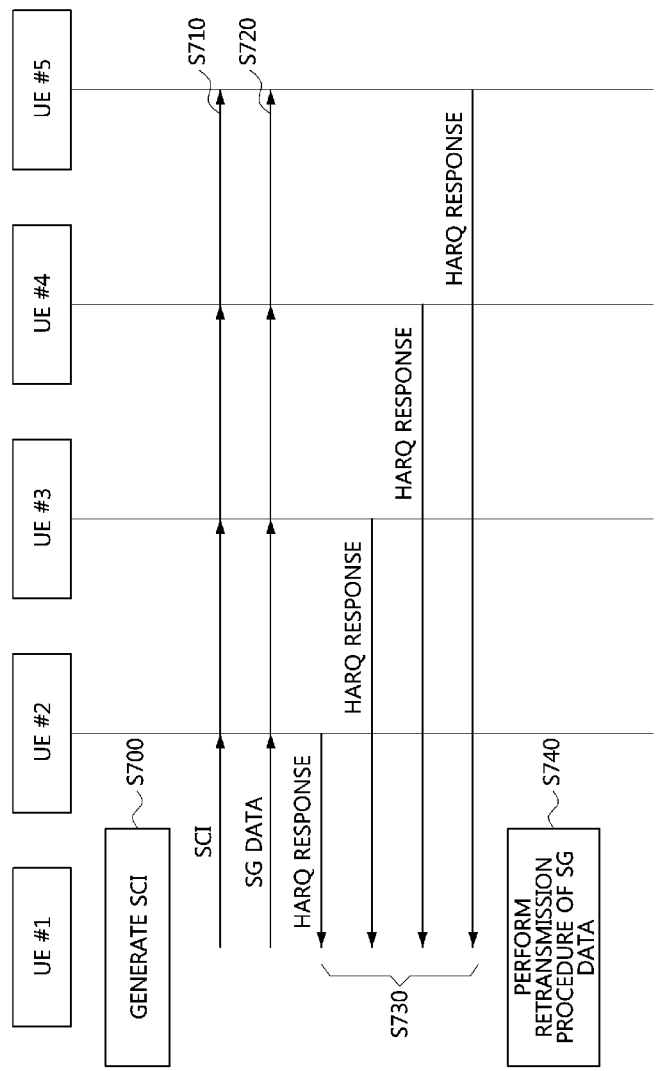
FIG. 7 is a sequence chart illustrating a first exemplary embodiment of a sidelink communication method in a communication system.

FIG. 7 is a sequence chart illustrating a first exemplary embodiment of a sidelink communication method in a communication system.

As shown in FIG. 7, a communication system may include a plurality of UEs (e.g., UEs #1 to #5). Each of the UEs #1 to #5 may be located in a vehicle and perform sidelink-based V2X communication. For example, when the UE #1 shown in FIG. 7 is the UE 235 shown in FIG. 2, one of the UEs #2 to #5 shown in FIG. 7 may be the UE 236 shown in FIG. 2. Each of the UEs #1 to #5 may be configured identically or similarly to the communication node 300 shown in FIG. 3. Each of the UEs #1 to #5 may support the protocol stacks shown in FIGS. 4 to 6.

The sidelink communication may be performed in a groupcast scheme. The sidelink communication performed in a groupcast scheme may be referred to as 'sidelink groupcast communication'. The UEs #1 to #5 may participate in the sidelink groupcast communication. In the sidelink groupcast communication, the UE #1 may be a transmitting UE and the UEs #2 to #5 may be receiving UEs. For example, the UE #1 may transmit sidelink channels and/or signals in a groupcast scheme, and the UEs #2 to #5 participating in the sidelink groupcast communication may receive the sidelink channels and/or signals from the UE #1.

Sidelink Groupcast (SG) ID

The UEs #1 to #5 participating in the sidelink groupcast communication may be configured as one group. An SG ID may be configured for identifying a UE in the group. For example, the SG ID may be configured as shown in Table 3 below.

TABLE 3

| UE | SG ID |
|---|---|
| UE #1 | 000 |
| UE #2 | 001 |
| UE #3 | 010 |
| UE #4 | 011 |
| UE #5 | 100 |

The SG ID may be configured by a base station (e.g., a base station to which the UE #1 is connected) or the UE #1 (i.e., transmitting UE). When the SG ID is configured by the base station, the base station may inform the SG IDs to the UEs #1 to #5 participating in the sidelink groupcast communication. For example, the SG ID may be transmitted from the base station to each of the UEs #1 to #5 via system information, RRC message, MAC control element (CE), and/or DCI. When the SG ID is configured by the UE #1, the UE #1 may inform the SG IDs to the UEs #2 to #5 participating in the sidelink groupcast communication. For example, the SG ID may be transmitted to each of the UEs #2 to #5 via MAC CE and/or SCI.

Sidelink Groupcast-Radio Network Temporary Identifier (SG-RNTI)

An SG-RNTI may be configured for the sidelink groupcast communication. The SG-RNTI may be used for transmission and reception of SCIs for the sidelink groupcast communication. The SG-RNTI may be configured on a group basis. For example, if a group #1 includes UEs #2 to #5, and a group #2 includes UEs #7 to #10, the SG-RNTI for group #1 may be configured differently from the SG-RNTI for group #2.

The SG-RNTI may be configured by the base station (e.g., the base station to which the UE #1 is connected) or the UE #1 (i.e., transmitting UE). When the SG-RNTI is configured by the base station, the base station may inform the SG-RNTI to the UEs #1 to #5 participating in the sidelink groupcast communication. For example, the SG-RNTI may be transmitted from the base station to the UEs #1 to #5 via system information, RRC message, MAC control element (CE), and/or DCI. When the SG-RNTI is configured by the UE #1, the UE #1 may inform the SG-RNTI to the UEs #2 to #5 participating in the sidelink groupcast communication. For example, the SG-RNTI may be transmitted to the UEs #2 to #5 via MAC CE and/or SCI.

Meanwhile, when there is sidelink groupcast data (hereinafter, referred to as 'SG data') to be transmitted in a groupcast scheme, the UE #1 may generate an SCI including resource allocation information for the SG data and/or resource allocation information for an HARQ response for the SG data (S700). Also, the SCI may further include an indicator indicating whether or not to perform an HARQ response procedure (e.g., HARQ feedback procedure). For example, the size of the indicator may be 1 bit. The indicator set to '0' may indicate that the HARQ response procedure is not performed. In this case, the HARQ response procedure for the SG data scheduled by the SCI may not be performed, and the corresponding SCI may not include the resource allocation information for the HARQ response. The indicator set to '1' may indicate that the HARQ response procedure is performed. In this case, the HARQ response procedure for the SG data scheduled by the SCI may be performed, and the corresponding SCI may include the resource allocation information for the HARQ response.

The resource allocation information for the SG data may include one or more of information indicating a time-frequency resource through which the SG data is transmitted, information indicating a modulation and coding scheme (MCS) applied to the SG data, and information indicating a transmission power of the SG data.

Resource Allocation Scheme #1 for HARQ Response for SG Data

The resource for the HARQ response for the SG data may be configured differently for each UE. When the UEs #2 to #5 participate in sidelink groupcast communication, the HARQ response resources for the SG data may be configured as follows.

Figure 8:
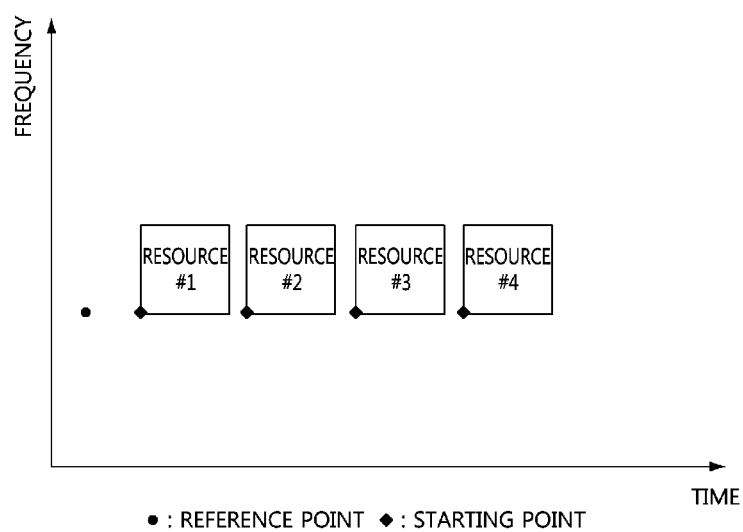
FIG. 8 is a conceptual diagram illustrating a first exemplary embodiment of HARQ response resources in sidelink groupcast communication.
Figure 9:
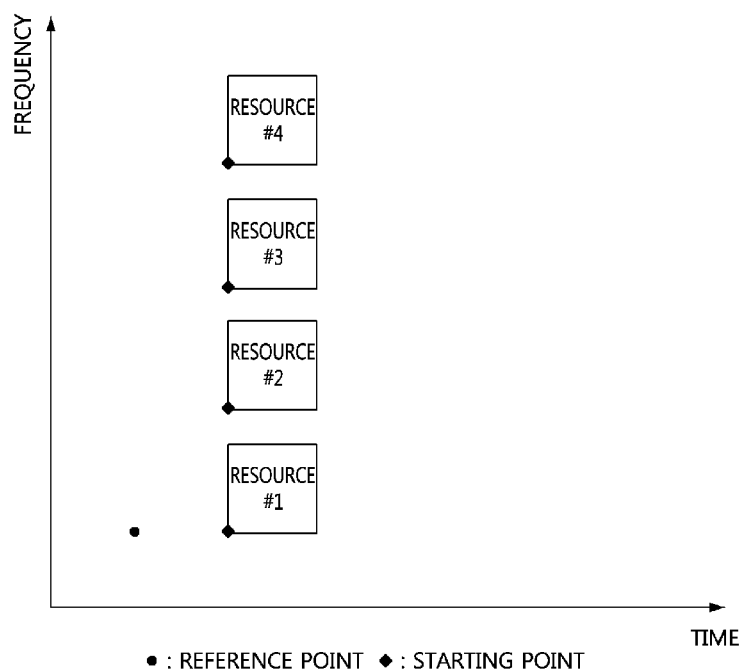
FIG. 9 is a conceptual diagram illustrating a second exemplary embodiment of HARQ response resources in sidelink groupcast communication.
Figure 10:
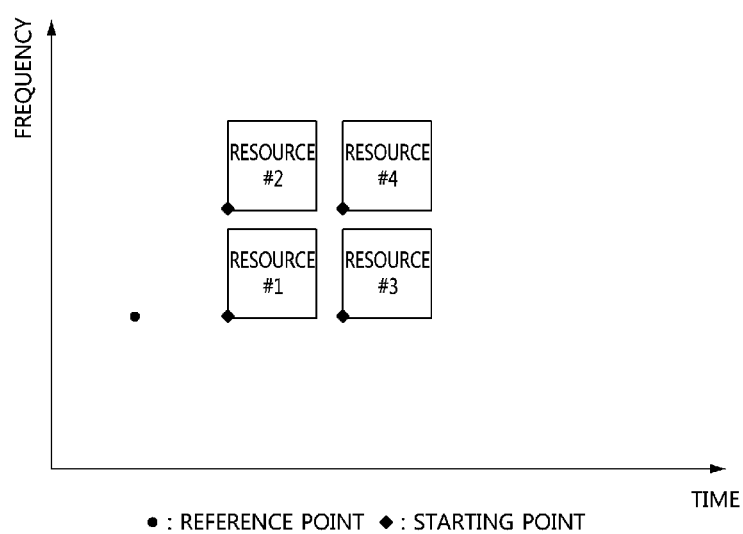
FIG. 10 is a conceptual diagram illustrating a third exemplary embodiment of HARQ response resources in sidelink groupcast communication.

FIG. 8 is a conceptual diagram illustrating a first exemplary embodiment of HARQ response resources in sidelink groupcast communication, FIG. 9 is a conceptual diagram illustrating a second exemplary embodiment of HARQ response resources in sidelink groupcast communication, and FIG. 10 is a conceptual diagram illustrating a third exemplary embodiment of HARQ response resources in sidelink groupcast communication.

As show in FIG. 8, the HARQ response resources may be configured in a time division multiplexing (TDM) scheme. A resource #1 may be an HARQ response resource for the UE #2. For example, the UE #2 may transmit an HARQ response for the SG data through the resource #1. A resource #2 may be an HARQ response resource for the UE #3, a resource #3 may be an HARQ response resource for the UE #4, and a resource #4 may be an HARQ response resource for the UE #5.

As show in FIG. 9, the HARQ response resources may be configured in a frequency division multiplexing (FDM) scheme. A resource #1 may be an HARQ response resource for the UE #2. For example, the UE #2 may transmit an HARQ response for the SG data through the resource #1. A resource #2 may be an HARQ response resource for the UE #3, a resource #3 may be an HARQ response resource for the UE #4, and a resource #4 may be an HARQ response resource for the UE #5.

As show in FIG. 10, the HARQ response resources may be configured in a time-frequency division multiplexing scheme. A resource #1 may be an HARQ response resource for the UE #2. For example, the UE #2 may transmit an HARQ response for the SG data through the resource #1. A resource #2 may be an HARQ response resource for the UE #3, a resource #3 may be an HARQ response resource for the UE #4, and a resource #4 may be an HARQ response resource for the UE #5.

Resource Allocation Scheme #2 for HARQ Response for SG Data

The HARQ response resource for the SG data may be configured for each group. For example, a group #1 may include UEs #2 #5. In the exemplary embodiment shown in FIG. 8, the resource #1 may be an HARQ response resource for the group #1. In the exemplary embodiment shown in FIG. 9, the resource #1 may be an HARQ response resource for the group #1. In the exemplary embodiment shown in FIG. 10, the resource #1 may be an HARQ response resource for the group #1. In this case, the resources #2 to #4 may not be used. The HARQ response resource for the group #1 may be different from the HARQ response resource for a group #2.

Each of the UEs #2 to #5 may transmit an HARQ response for the SG data to the UE #1 using the resource #1. In this case, each of the UEs #2 to #5 may transmit an HARQ response using a different orthogonal cover code (OCC). Accordingly, the base station can distinguish the HARQ response of the UE #2, the HARQ response of the UE #3, the HARQ response of the UE #4, and the HARQ response of the UE #5 received through the same resource.

Alternatively, the HARQ response resource for the SG data may be configured for each subgroup. For example, a subgroup #1 may include UEs #2 and #3, and a subgroup #2 may include UEs #4 and #5. In the exemplary embodiment shown in FIG. 8, the resource #1 may be an HARQ response resource for the subgroup #1, and the resource #2 may be an HARQ resource for the subgroup #2. In the exemplary embodiment shown in FIG. 9, the resource #1 may be an HARQ response resource for the subgroup #1, and the resource #2 may be an HARQ resource for the subgroup #2. In the exemplary embodiment shown in FIG. 10, the resource #1 may be an HARQ response resource for the subgroup #1, and the resource #2 may be an HARQ resource for the subgroup #2. In this case, the resources #3 to #4 may not be used.

Each of the UEs #2 and #3 may transmit an HARQ response for the SG data to the UE #1 using the resource #1. Each of the UEs #4 and #5 may transmit an HARQ response for the SG data to the UE #1 using the resource #2. In this case, each of the UEs #2 to #5 may transmit an HARQ response using a different OCC. Accordingly, the base station can distinguish the HARQ response of the UE #2 and the HARQ response of the UE #3 received through the same resource, and can distinguish the HARQ response of the UE #4 and the HARQ response of the UE #5 received through the same resource.

Referring back to FIG. 7, the UE #1 may generate resource allocation information indicating the HARQ response resource for SG data. For example, the resource allocation information may be configured in form of a bitmap. In the exemplary embodiment shown in FIG. 8, information (e.g., information of time-frequency resource) on each of the resources #1 to #4 may be transmitted in advance to the UEs #2 to #5, and the resource allocation information (e.g., bitmap) may indicate a UE to use the corresponding resource. In this case, the resource allocation information may be composed of 12 bits. When the SG IDs defined in Table 3 are used and the resource allocation information is set to '010 011 100 001', the resource #1 may be an HARQ response resource configured for the UE #3, the resource #2 may be an HARQ response resource configured for the UE #4, the resource #3 may be an HARQ response resource configured for the UE #5, and the resource #4 may be an HARQ response resource configured for the UE #1. In the exemplary embodiment shown in FIG. 10, when the SG IDs defined in Table 3 are used and the resource allocation information is set to '010 011 100 001', the resource #1 may be an HARQ response resource configured for the UEs #3 and #4, and the resource #2 may be an HARQ response resource configured for the UEs #5 and #2.

Alternatively, the location of the HARQ response resource may be indicated by an offset between a reference point (e.g., reference point shown in FIGS. 8 to 10) and a starting point (e.g., starting point shown in FIGS. 8 to 10). In this case, the resource allocation information may include one or more among information elements defined in Table 4 below.

TABLE 4

| Information element | Description |
|---|---|
| Reference point | Time-domain location of reference point, frequency-domain location of reference point |
| Size of HARQ response resource | Time-domain size of HARQ response resource, frequency-domain size of HARQ response resource |
| Location of HARQ response resource for UE #2 | Time-domain offset between reference point and starting point, frequency-domain offset between reference point and starting point |
| Location of HARQ response resource for UE #3 | Time-domain offset between reference point and starting point, frequency-domain offset between reference point and starting point |
| Location of HARQ response resource for UE #4 | Time-domain offset between reference point and starting point, frequency-domain offset between reference point and starting point |
| Location of HARQ response resource for UE #5 | Time-domain offset between reference point and starting point, frequency-domain offset between reference point and starting point |

For example, the reference point and the size of the HARQ response resource defined in Table 4 may be included in system information and/or an RRC message. Alternatively, in case that the offset between the reference point and the starting point is determined by the SG ID, the resource allocation information may not include the location of the HARQ response resource.

The UE #1 may transmit an SCI including resource allocation information for the SG data and resource allocation information for HARQ response for the SG data to the UEs #2 to #5 (S710). The SCI may be transmitted on a PSCCH. A cyclic redundancy check (CRC) of the SCI may be scrambled by the SG-RNTI. A format of the SCI format may be configured differently according to a scheme of configuring the HARQ response resource. For example, a format of an SCI indicating the HARQ response resource shown in FIG. 8 may be different from a format of an SCI indicating the HARQ response resource shown in FIG. 9. Alternatively, a format of the SCI may be configured differently according to a scheme of indicating the HARQ response resource. For example, a format of an SCI including the bitmap indicating the HARQ response resource may be configured differently from a format of an SCI including the information element(s) defined in Table 4.

The UEs #2 to #5 may perform a monitoring operation using the SG-RNTI on a PSCCH. For example, the UEs #2 to #5 may perform a descrambling operation for a CRC of an SCI obtained from the UE #1 using the SG-RNTI, and when a result of the CRC is successful, the UEs #2 to #5 may identify the information included in the SCI (e.g., resource allocation information for the SG data and resource allocation information for HARQ response for the SG data). In this case, the UEs #2 to #5 may determine that the SCI obtained from the UE #1 includes information for the sidelink groupcast communication.

Also, the UEs #2 to #5 may identify a configuration scheme of HARQ response resources (e.g., the scheme of configuring HARQ response resources shown in FIG. 8, the scheme of configuring HARQ response resources shown in FIG. 9, or the scheme of configuring HARQ response resources shown in FIG. 10) which is indicated by the corresponding SCI based on the formation of the SCI. Alternatively, the UEs #2 to #5 may identify an indication scheme of HARQ response resources (e.g., bitmap or information element(s) defined in Table 4) which is indicated by the corresponding SCI based on the format of the SCI.

On the other hand, the UE #1 may transmit SG data using the resource indicated by the SCI (S720). The SG data may be transmitted on a PSSCH. Each of the UEs #2 to #5 may receive the SG data from the UE #1 by performing a monitoring operation on the resource (e.g., PSSCH) indicated by the SCI. Each of the UEs #2 to #5 may transmit an HARQ response for the SG data to the UE #1 (S730). The HARQ response may be transmitted on a physical sidelink feedback channel (PSFCH). For example, if the SG data is successfully received at each UE, each of the UEs #2 to #5 may transmit an acknowledgment (ACK) to the UE #1 as the HARQ response to the SG data through the resource indicated by the SCI. When the reception of the SG data fails, each of the UE #2 to #5 may transmit a negative ACK (NACK) to the UE #1 as the HARQ response to the SG data through the resource indicated by the SCI.

For example, in the exemplary embodiment shown in FIG. 8, the UE #2 may transmit an HARQ response for the SG data through the resource #1, the UE #3 may transmit an HARQ response for the SG data through the resource #2, the UE #4 may transmit an HARQ response for the SG data through the resource #3, and the UE #5 may transmit an HARQ response for the SG data through the resource #4. Alternatively, in the exemplary embodiment shown in FIG. 9, the UEs #2 and #3 may transmit their HARQ responses through the resource #1. In this case, an OCC applied to the HARQ response of the UE #2 may be different from an OCC applied to the HARQ response of the UE #3. The UEs #4 and #5 may transmit their HARQ responses through the resource #2. In this case, an OCC applied to the HARQ response of the UE #4 may be different from an OCC applied to the HARQ response of the UE #5. In sidelink groupcast communication, ACK transmission may be omitted, and only NACK may be transmitted.

The UE #1 may perform a monitoring operation on the resource indicated by the SCI to receive the HARQ response. For example, the UE #1 may receive an HARQ response of each of the UEs #2 to #5 based on the configuration scheme and the indication scheme of HARQ response resources, which are indicated by the SCI. For example, in the exemplary embodiment shown in FIG. 8, the UE #1 may receive the HARQ response of the UE #2 for the SG data through the resource #1, receive the HARQ response of the UE #3 for the SG data through the resource #2, receive the HARQ response of the UE #4 for the SG data through the resource #3, and receive the HARQ response of the UE #5 for the SG data through the resource #4.

Alternatively, in the exemplary embodiment shown in FIG. 9, the UE #1 may receive the HARQ responses of the UEs #2 and #3 for the SG data through the resource #1. Since the OCC applied to the HARQ response of the UE #2 is different from the OCC applied to the HARQ response of the UE #3, the UE #1 can distinguish the HARQ response of the UE #2 and the HARQ response of the UE #3 obtained from the same resource. Also, the UE #1 may receive the HARQ responses of the UEs #4 and #5 for the SG data through the resource #2. Since the OCC applied to the HARQ response of the UE #4 is different from the OCC applied to the HARQ response of the UE #5, the UE #1 can distinguish the HARQ response of the UE #4 and the HARQ response of the UE #5 obtained from the same resource.

When one or more NACKs are received, the UE #1 may perform a retransmission procedure for the SG data (S740). For example, the UE #1 may retransmit the SG data in a groupcast scheme to all UEs (e.g., the UEs #2 to #5) participating in sidelink groupcast transmission. Alternatively, the UE #1 may retransmit the SG data in a groupcast scheme to one or more UEs that have transmitted the NACK. Alternatively, the UE #1 may retransmit the SG data to each of the one or more UEs that have transmitted the NACK in a unicast scheme.

In the retransmission procedure of the SG data, the UE #1 may change a transmission scheme of the SG data. For example, when the number of received NACKs is greater than or equal to a threshold value, the UE #1 may change an MCS applied to the SG data. When the number of received NACKs is greater than or equal to the threshold value, the UE #1 may determine that a state of a sidelink channel is bad. Accordingly, the UE #1 may perform the retransmission procedure of the SG data using an MCS having a lower level than the MCS used in the step S720.

In the retransmission procedure of the SG data, the UE #1 may perform the retransmission procedure of the SG data using a time-frequency resource different from the time-frequency resource used in the step S720. Information indicating the MCS and information indicating the time-frequency resource used in the retransmission procedure of the SG data may be transmitted to the corresponding UE through an SCI.

The UE #1 may perform the retransmission procedure of the SG data until receiving ACKs from all UEs (e.g., UEs #2 to #5) participating in sidelink groupcast communication. Alternatively, when the number of retransmissions of the SG data is greater than or equal to a threshold, the UE #1 may stop the retransmission procedure of the SG data. Alternatively, when the number of received ACKs is greater than or equal to a threshold, the UE #1 may stop the retransmission procedure of the SG data. Here, the thresholds used to determine whether to stop the retransmission procedure of the SG data may be set according to the characteristics of the SG data (e.g., background data, audio data, video data, or the like) or the characteristics of the sidelink service (e.g., eMBB requirements, URLLC requirements, or the like).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A sidelink communication method performed by a first user equipment (UE) in a communication system, the sidelink communication method comprising:
   generating sidelink control information (SCI) including first resource allocation information for sidelink groupcast data and second resource allocation information for a hybrid automatic repeat request (HARQ) response for the sidelink groupcast data, the second resource allocation information including first information used to indicate each of a plurality of UEs using time-frequency resources for transmission of the HARQ response;

transmitting the SCI to the plurality of UEs participating in sidelink communication;

transmitting the sidelink groupcast data to the plurality of UEs using resources indicated by the first resource allocation information; and receiving the HARQ response for the sidelink groupcast data from one or more UEs among the plurality of UEs using at the time-frequency resources indicated by the second resource allocation information, wherein the time-frequency resources are configured to be orthogonal for the plurality of UEs and the first information includes sidelink groupcast identifiers used to distinguish the plurality of UEs using the time-frequency resources, and wherein the first information is a bitmap which is composed of each of the sidelink groupcast identifiers of the plurality of UEs in the sidelink communication.

2. The sidelink communication method according to claim 1, wherein the SCI further includes an indicator indicating whether or not to perform an HARQ response procedure for the sidelink groupcast data.

3. The sidelink communication method according to claim 1, wherein the SCI is generated using a sidelink groupcast-radio network temporary identifier (SG-RNTI) configured for sidelink groupcast communication.

4. The sidelink communication method according to claim 1, wherein a format of the SCI is configured differently according to an allocation scheme or an indication scheme of time-frequency resources for the HARQ response.

5. The sidelink communication method according to claim 1, wherein the second resource allocation information includes information indicating a reference point and an offset between the reference point and a starting point of each of the time-frequency resources for the plurality of UEs.

6. The sidelink communication method according to claim 1, wherein the second resource allocation information includes information on orthogonal cover codes (OCCs) applied to the HARQ response, and the OCCs are configured to be orthogonal for the plurality of UEs.

7. The sidelink communication method according to claim 1, further comprising performing a retransmission procedure of the sidelink groupcast data when the HARQ response received from the one or more UEs is a negative acknowledgement (NACK), wherein the retransmission procedure is performed in a groupcast scheme with all UEs participating in the sidelink communication, a groupcast scheme with the one or more UEs, or a unicast scheme with each of the one or more UEs.

8. A sidelink communication method performed by a first user equipment (UE) in a communication system, the sidelink communication method comprising:

receiving sidelink control information (SCI) from a second UE, the SCI including first resource allocation information for sidelink groupcast data and second resource allocation information for a hybrid automatic repeat request (HARQ) response for the sidelink groupcast data, the second resource allocation information including first information used to indicate each of a plurality of UEs using time-frequency resources for transmission of the HARQ response;

receiving the sidelink groupcast data from the second UE through resources indicated by the first resource allocation information; and transmitting the HARQ response for the sidelink groupcast data to the second UE through the time-frequency resources indicated by the second resource allocation information, wherein the time-frequency resources are configured to be orthogonal for the plurality of UEs and the first information includes sidelink groupcast identifiers used to distinguish the plurality of UEs using the time-frequency resources, and wherein the first information is a bitmap which is composed of each of the sidelink groupcast identifiers of the plurality of UEs in the sidelink communication.

9. The sidelink communication method according to claim 8, wherein the SCI further includes an indicator indicating whether or not to perform an HARQ response procedure for the sidelink groupcast data, and the HARQ response is transmitted when the indicator indicates that the HARQ response procedure is performed.

10. The sidelink communication method according to claim 8, wherein the SCI is received using a sidelink groupcast-radio network temporary identifier (SG-RNTI) configured for sidelink groupcast communication.

11. The sidelink communication method according to claim 8, wherein a format of the SCI is configured differently according to an allocation scheme or an indication scheme of the time-frequency resources for the HARQ response.

12. The sidelink communication method according to claim 8, wherein the second resource allocation information includes information on orthogonal cover codes (OCCs) applied to the HARQ response, and the OCCs are configured to be orthogonal for the plurality of UEs.

13. A first user equipment (UE) performing sidelink communication in a communication system, the first UE comprising a processor and a memory storing at least one instruction executable by the processor, wherein when executed by the processor, the at least one instruction is configured the processor to:

generate sidelink control information (SCI) including first resource allocation information for sidelink groupcast data and second resource allocation information for a hybrid automatic repeat request (HARQ) response for the sidelink groupcast data, the second resource allocation information including first information used to indicate each of a plurality of UEs using time-frequency resources for transmission of the HARQ response;

transmit the SCI to the plurality of UEs participating in sidelink communication;

transmit the sidelink groupcast data to the plurality of UEs using resources indicated by the first resource allocation information; and receive the HARQ response for the sidelink groupcast data from one or more UEs among the plurality of UEs using at the time-frequency resources indicated by the second resource allocation information, wherein the time-frequency resources are configured to be orthogonal for the plurality of UEs and the first information includes sidelink groupcast identifiers used to distinguish the plurality of UEs using the time-frequency resources, and wherein the first information is a bitmap which is composed of each of the sidelink groupcast identifiers of the plurality of UEs in the sidelink communication.

14. The first UE according to claim 13, wherein the SCI further includes an indicator indicating whether or not to perform an HARQ response procedure for the sidelink groupcast data.

15. The first UE according to claim 13, wherein the second resource allocation information includes information on orthogonal cover codes (OCCs) applied to the HARQ response, and the OCCs are configured to be orthogonal for the plurality of UEs.

16. The first UE according to claim 13, wherein the at least one processor is further configured the processor to perform a retransmission procedure of the sidelink groupcast data when the HARQ response received from the one or more UEs is a negative acknowledgement (NACK), wherein the retransmission procedure is performed in a groupcast scheme with all UEs participating in the sidelink communication, a groupcast scheme with the one or more UEs, or a unicast scheme with each of the one or more UEs.

* * * * *